(12) United States Patent
Schmid et al.

(10) Patent No.: US 10,408,220 B2
(45) Date of Patent: Sep. 10, 2019

(54) METHOD FOR OPERATING A FLUID CONVEYING DEVICE OF A MOTOR VEHICLE COMPRISING AT LEAST ONE AERODYNAMIC BEARING

(71) Applicant: Bayerische Motoren Werke Aktiengesellschaft, Munich (DE)

(72) Inventors: Johannes Schmid, Munich (DE); Simon Grilc, Munich (DE); Fabian Brandl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 133 days.

(21) Appl. No.: 15/591,429

(22) Filed: May 10, 2017

(65) Prior Publication Data

US 2017/0241426 A1 Aug. 24, 2017

Related U.S. Application Data

(63) Continuation of application No. PCT/EP2015/075317, filed on Oct. 30, 2015.

(30) Foreign Application Priority Data

Nov. 12, 2014 (DE) .................. 10 2014 223 126

(51) Int. Cl.
*F04D 29/056* (2006.01)
*F04D 27/02* (2006.01)
(Continued)

(52) U.S. Cl.
CPC ....... *F04D 29/056* (2013.01); *F04D 27/0261* (2013.01); *F04D 29/057* (2013.01);
(Continued)

(58) Field of Classification Search
CPC ... H01M 8/043; F04D 27/0261; F04D 29/056
See application file for complete search history.

(56) References Cited

U.S. PATENT DOCUMENTS

| 4,394,091 A | 7/1983 | Klomp |
| 4,728,201 A | 3/1988 | Abbe |
| (Continued) | | |

FOREIGN PATENT DOCUMENTS

| CN | 102589885 A | 7/2012 |
| DE | 10 2007 052 831 A1 | 5/2008 |
| (Continued) | | |

OTHER PUBLICATIONS

International Search Report (PCT/ISA/210) issued in PCT Application No. PCT/EP2015/075317 dated Feb. 4, 2016 with English translation (Six (6) pages).
(Continued)

*Primary Examiner* — Anne M Antonucci
*Assistant Examiner* — Renee LaRose
(74) *Attorney, Agent, or Firm* — Crowell & Moring LLP

(57) ABSTRACT

A method is provided for operating a fluid conveying device of a motor vehicle having at least one aerodynamic bearing. The method reduces the rotational speed of the aerodynamic bearing to a rest speed, wherein the rest speed is below a lifting speed, in which case the bearing builds up an air film for bearing free of mixed friction, and wherein the rest speed is above a lowering speed, in which case the bearing has reduced the air film such that mixed friction occurs. The fluid conveying device is operated at the rest speed.

13 Claims, 1 Drawing Sheet

(51) Int. Cl.
*F04D 29/057* (2006.01)
*F16C 17/24* (2006.01)
*F16C 33/10* (2006.01)
*H01M 8/043* (2016.01)
*H01M 8/24* (2016.01)

(52) U.S. Cl.
CPC ........ *F16C 17/246* (2013.01); *F16C 33/1005* (2013.01); *H01M 8/043* (2016.02); *H01M 8/24* (2013.01); *F05D 2260/85* (2013.01)

(56) References Cited

U.S. PATENT DOCUMENTS

| | | | |
|---|---|---|---|
| 4,754,494 A | 6/1988 | Kumar | |
| 2008/0110685 A1 | 5/2008 | Hild | |
| 2013/0142671 A1* | 6/2013 | Stein | F04D 29/046 417/53 |
| 2014/0119881 A1* | 5/2014 | Kalra | F01D 11/04 415/1 |
| 2016/0190615 A1 | 6/2016 | Longman et al. | |

FOREIGN PATENT DOCUMENTS

| | | |
|---|---|---|
| DE | 10 2012 207 661 A1 | 11/2013 |
| DE | 10 2012 208 762 A1 | 11/2013 |
| DE | 10 2013 217 858 A1 | 3/2015 |
| EP | 1 840 393 B1 | 6/2010 |
| EP | 1 999 811 B1 | 3/2014 |
| WO | WO 2014/001786 A1 | 1/2014 |

OTHER PUBLICATIONS

German-language Written Opinion (PCT/ISA/237) issued in PCT Application No. PCT/EP2015/075317 dated Feb. 4, 2016 (Six (6) pages).

German-language Search Report issued in counterpart German Application No. 10 2014 223 126.4 dated Jul. 13, 2015 with partial English translation (Eleven (11) pages).

Chinese-language Office Action issued in counterpart Chinese Application No. 201580044810.X dated Nov. 17, 2017 with English translation (Fourteen (14) pages).

\* cited by examiner

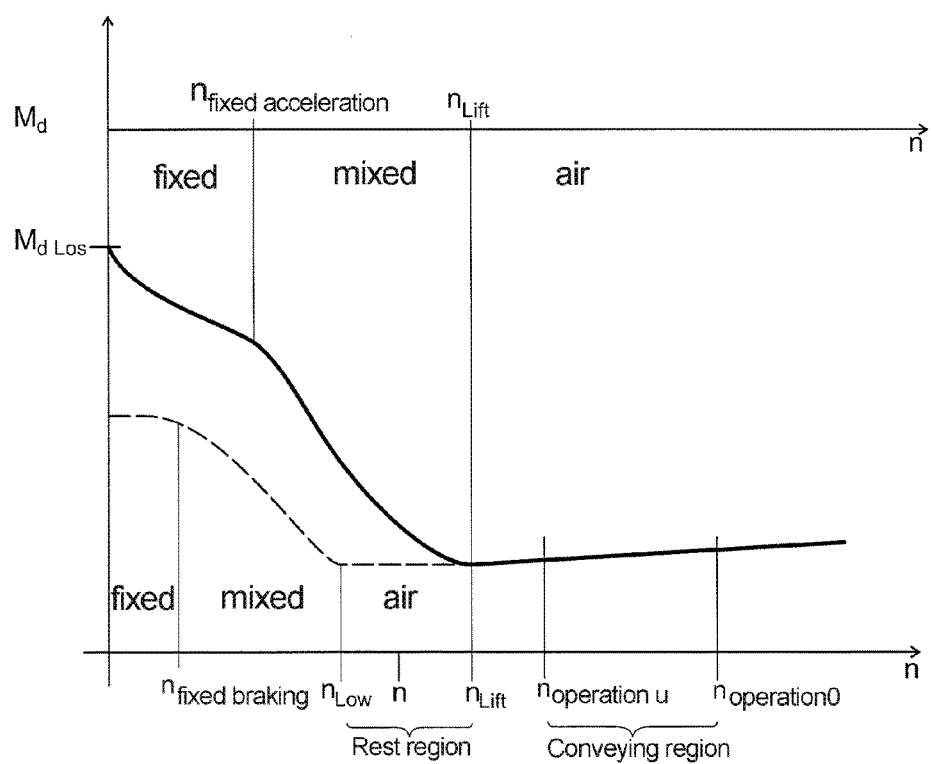

METHOD FOR OPERATING A FLUID CONVEYING DEVICE OF A MOTOR VEHICLE COMPRISING AT LEAST ONE AERODYNAMIC BEARING

CROSS REFERENCE TO RELATED APPLICATIONS

This application is a continuation of PCT International Application No. PCT/EP2015/075317, filed Oct. 30, 2015, which claims priority under 35 U.S.C. § 119 from German Patent Application No. 10 2014 223 126.4, filed Nov. 12, 2014, the entire disclosures of which are herein expressly incorporated by reference.

BACKGROUND AND SUMMARY OF THE INVENTION

The technology disclosed here relates to a method for operating a fluid conveying device of a motor vehicle having at least one aerodynamic bearing. Aerodynamic (air) bearings can be used for radial or axial mounting of moving components. Aerodynamic air bearings are characterized in that they themselves form an air film for mounting the moving components. However, this is only achieved above a certain rotational speed, which is frequently designated as lift-off speed or lifting speed.

A distinction is made between solid-state friction, air friction, and mixed friction according to the bearing rotational speed. Solid-state friction is present when the shaft in the bearing is at rest. At a low rotational speed of the flow machine below the lift-off speed, a mixed friction zone is formed between shaft and bearing, which can lead to more rapid wear of the bearing. Air friction or fluid friction is present when the bearing is operated above the lift-off speed.

Known from DE 10 2012 208 762 A1 is an aerodynamic air bearing, in which the minimal rotational speed is as low as possible. However the minimal rotational speed is not lower than the lift-off speed of the aerodynamic air bearing. For shutting down the flow machine, according to this document, braking should take place as rapidly as possible from the minimal rotational speed to a standstill.

Fluid conveying devices of motor vehicles can, for example, be configured as compressors and, particularly preferably, as air-mounted turbocompressors. These turbocompressors usually have an idle or standby speed, which is selected so that operation in the mixed friction zone is reliably avoided. Usually, this idle speed is somewhat higher than the lift-off speed. Operation above the idle speed should thereby ensure wear-free operation.

The fluid conveying devices in the motor vehicle are usually not operated continuously if specific ambient conditions such as, for example, coldness, do not require it. The braking and renewed startup of fluid conveying devices with aerodynamic bearings from very high idle speeds (e.g. 25,000 rpm) require a certain amount of time. Consequently, a fluid conveying device with aerodynamic bearings exhibits a certain undesirable inertia. Frequent switching on and off the fluid conveying device additionally results in increased operation in the mixed friction zone and, consequently, in damage to the bearing, which may negatively influence the lifetime of the aerodynamic bearings. Such bearing damage can only be avoided by expensive measures or by regular exchange of the bearings of a fluid conveying device.

As an alternative to the frequent switching off and on, the compressor could also be operated continuously. However, this would have the result that a comparatively large amount of energy is used to operate the compressor at the comparatively high idle speeds. In addition, the compressors also cause a certain minimum noise level, which should preferably be reduced or avoided.

It is a preferred object of the present invention to reduce or eliminate the disadvantages.

The object of the present invention is solved by a method for operating a fluid conveying device of a motor vehicle having at least one aerodynamic bearing. Preferably, the fluid conveying device has two aerodynamic bearings, which mount a shaft of the fluid conveying device. Such fluid conveying devices are used, for example, to convey oxidizing agents to a fuel cell or a fuel cell system, such as is specified for example hereinafter. Preferably, the fluid conveying device is configured as a compressor and particularly preferably as an air-mounted turbocompressor, which supplies the fuel cell system with oxidizing agents, for example, oxygen or air.

The method disclosed here includes, inter alia, the step of reducing the rotational speed of the aerodynamic bearing to an idle or rest speed (the term "rest speed" is used hereinafter for simplicity) if the fluid conveying device is not intended to convey any fluid or negligibly small amounts of fluid. The rotational speed of the aerodynamic bearing in this case corresponds to the rotational speed of the component accommodated in the bearing (e.g. a shaft), which rotates relative to the bearing. In other words, the rotational speed of the fluid conveying device is reduced to a rest speed when the controller for the fluid conveying device outputs a control signal according to which the fluid conveying device should not convey any fluid. Any small quantities of conveyed fluid, which are obtained as a result of the rest speed during the rest time, are not preventable and are taken into account or tolerated by the control system or compensated by suitable measures (e.g. bypass). The rest speed is a rotational speed, at which the conveying device is quasi inactive during a rest time or is operated in standby mode without the mounted shaft itself being at rest.

The rest speed lies below the lift-off speed or lifting speed, at which the aerodynamic bearing builds up from the rest position, accelerating the air film for mixed-friction-free mounting of the moving parts. In other words, the rest speed lies below the rotational speed, at which the shaft lifts from the bearing base in the case of acceleration.

The rest speed lies further above a lowering speed, at which the aerodynamic bearing has reduced the air film by braking from the rotational speed above the lifting speed in such a manner that mixed friction occurs. When the fluid conveying device is therefore braked from the operating rotational speed above the lifting speed, a lowering speed is obtained, at which the shaft has a reduced distance from the bearing base such that mixed friction occurs. The fluid conveying device according to the technology disclosed here is operated above this lifting speed.

Consequently, the method disclosed here therefore includes the step of reducing the aerodynamic bearing to a rest speed, which lies in a speed range which is defined downward by the lowering speed and upward by the lifting speed or the idle speed of the aerodynamic bearing or the fluid conveying device.

The method disclosed here further includes the step of at least temporarily operating the aerodynamic bearing of the fluid conveying device or operating the fluid conveying device at the rest speed during a rest time.

Advantageously the lowered speed range or the rest speed is located in a range below the idle speed and outside or above the mixed friction range. Advantageously, a hysteresis effect is therefore utilized since, from an already running state, in which the aerodynamic bearing is located above the mixed friction range, the mixed friction range begins at a lower speed (the lowering speed) when there is a lowering of the speed.

A typical fluid conveying device of a motor vehicle with a fuel cell has a fluid conveying device configured as an air-mounted turbocompressor, which when idling at the idle speed prescribed by the manufacturer (e.g. 25,000 rpm) has a power consumption of about 250 W. If the fluid conveying device is now lowered from an operating speed above the idle speed to the rest speed (about 20,000 rpm), the power consumption is reduced to about 120 W. This results in a significant saving of the required energy.

It is particularly advantageous to restart from the rest speed compared to starting from a standstill. When restarting from the rest speed, the mixed friction range need not be overcome again. Consequently, the bearing wear can be reduced and the bearing lifetime increased. Also, the fluid conveying device operated with the method disclosed here exhibits a better dynamic response behavior, since the fluid conveying device need not first be accelerated from a standstill up to the rest speed.

In the special case of a restart during a shutdown of the fluid conveying device, in the previously known solutions a standstill must firstly be awaited, since it is only possible to start after the runout phase. According to the method disclosed here, however, the compressor is located at the lowered speed or rest speed, from which it can be activated at any time without a time delay.

The number of starts/stops is reduced appreciably as a result of this changed strategy for short standstill phases. Consequently, the bearing wear and ultimately also the associated costs can be reduced. Frequent starting and stopping of the fluid conveying device additionally loads the high-voltage storage device which must provide the energy.

According to the method disclosed here, the fluid conveying device can be not stopped and at least operated further at the rest speed when the motor vehicle is operating. Vehicle operation is understood here such that either the ignition is switched on or an autonomous operation of the motor vehicle exists, which has been initialized for example by a time switch function or a remote activation. Preferably, the fluid conveying device is not stopped and is operated at least at the rest speed when the motor vehicle continues to move. Further preferably, the fluid conveying device is not stopped and is operated at least at the rest speed when the motor vehicle continues to move at a speed of up to 70 km/h, preferably up to 50 km/h, and particularly preferably up to 30 km/h. In other words, a stopping of the fluid conveying device is in particular prevented when the motor vehicle is at a standstill ready for operation or continues to move at comparatively low speed. Further preferably, the fluid conveying device is not stopped when the motor vehicle is merely rolling, stopped at traffic lights or is maneuvering, for example at traffic lights.

Further preferably the fluid conveying device is not stopped and the bearing is operated at least at the rest speed when the drive energy is provided by a high-voltage storage device. The motor vehicle is, for example, driven by the high-voltage storage device during a low-speed road section (queue, rush-hour traffic, etc.).

Furthermore, the method can include the steps of:
predicting a rest time, and
stopping the fluid conveying device when the predicted rest time exceeds a limiting value of the rest time.

In other words, the control or regulating device can include a means by which the rest time can be determined. If it can be foreseen that the fluid conveying device will not be required for a longer period, it can thus be more appropriate to accept wear at the bearing and loss of performance in regard to the dynamics in order to save energy.

Preferably, the limiting value of the rest time is about 1 second to 20 minutes, further preferably about 3 seconds to 5 minutes, and particularly preferably about 10 seconds to 2 minutes. The limiting value of the rest time is, for example, selected in such a manner that the fluid conveying device is not stopped when the journey with the motor vehicle is interrupted by a corresponding traffic light signal.

Preferably, the prediction includes the steps of:
recording driving behavior information, navigation information, and/or environmental information; and
predicting the rest time taking into account an, in particular, external parameter, which represents driving behavior information, navigation information, and/or environmental information.

The driving behavior information representing the behavior of the driver is, for example, a speed profile in the city, cross country, or on the freeway; a shifting behavior; etc. Preferably, the controller of the motor vehicle can identify the driver by way of measured values, driver-specific inputs, and/or driver-specific systems. Driver-specific systems are, for example, a key code or a mobile telephone assigned to the driver, which is connected to the car. Driver-specific inputs are, for example, the profile selection or the selection of a stored seat position assigned to the driver, a uniquely assignable route (way to work), a mirror adjustment, etc. Another driver recognition device is, for example, a face recognition.

In particular, the vehicle sensors or any input elements can be used to determine the driving behavior. For example, the following factors can be taken into account: inclination sensor, driving dynamics, lateral acceleration sensor, detection of the pedal dynamics, driving experience switch, speed profile, position of aerodynamic components such as, for example, rear spoiler, etc. The controller is preferably capable of analyzing the driving behavior and assigning it to a driver. A driving behavior analysis can allow the power requirement to be predicted more accurately and the fluid conveying device to be operated predictively. Advantageously, this includes a controller capable of learning, for example, based on fuzzy logic. Advantageously, the controller is also able to analyze recurrent conditions and events, for example, by use of detected external parameters. Preferably, the controller is not only able to learn from the driving behavior of the driver but can furthermore also evaluate navigation information and environmental information and perform optimized predictions of potential operating parameters. For example, the controller is configured in such a manner that recurrent routes are optimized by a driver, and specifically on the basis of the findings from previous journeys. An example of an application for this is, for example, the frequently traveled route between home and place of work.

Advantageously the operation of the fluid conveying device is therefore acted upon predictively in advance such that impending rest times are optimally utilized. This predictive operating mode of the fluid conveying device for future operating points or operating states enables more efficient operation and less wear.

External parameters which represent navigation information are, for example, navigation parameters which include geoinformation such as, for example, position, distance, and/or height profile information. Navigation information is furthermore information about the driving cycle, i.e. the mix of city, cross-country, and/or freeway components in the overall route. Other navigation information is, for example, also traffic information such as current or future traffic problems. For example, navigation information includes current queue notifications or predictable traffic bottlenecks as a result of major events, rush-hour traffic, particular incidents and events such as for example, mass gatherings, etc. Navigation information is, for example, a crossroad, a traffic light and/or a traffic light signal, which entails a comparatively brief stop of the motor vehicle. During such a rest phase the fluid conveying device can be further operated.

Furthermore, the navigation information can be a traffic light phase. The traffic light signal can, for example be identified by use of a suitable communication signal, e.g. a radio signal and a suitable sensor on the motor vehicle.

Environmental information is, for example, current or future weather and/or space information, for example, temperature, air humidity, precipitation, wind speed, air pressure, etc. A space can, for example, be a parking place such as, for example, the garage. Particularly preferred is a fluid conveying device of an oxidizing agent conveying device, which conveys oxidizing agent to a fuel cell stack or to a regenerator of a fuel cell system.

A fuel cell system according to the technology disclosed here includes the at least one fuel cell as well as the peripheral system components (balance-of-plant components or BOP components), which can be used during operation of the at least one fuel cell. A fuel cell has an anode and a cathode, which in particular are separated by an iron-selective separator. The anode has a supply for fuel to the anode. In other words, during operation of the fuel cell system the anode is in fluid communication with a fuel reservoir. Preferred fuels for the fuel cell system are: hydrogen, low-molecular alcohol, biofuels, or liquefied natural gas. The cathode for example has a supply for an oxidizing agent. Preferred oxidizing agents are, for example, air, oxygen, and peroxide. The ion-selective separator can, for example, be configured as a proton exchange membrane (PEM). Preferably a cation-selective polymer electrolyte membrane is used. Materials for such a membrane are: Nafion®, Flemion®, and Aciplex®. Here, for simplicity, a system with a fuel cell is frequently discussed. If a system component is listed in the singular hereinafter, the plural should also be included. For example, a multiplicity of fuel cells and in some cases, a multiplicity of BOP components can be provided.

The regenerator is a system component of a so-called redox fuel cell system, in which a catholyte solution is circulated between cathode and regenerator on the cathode side. Such redox fuel cells are known from WO 2014/001786 A1, DE 10 2013 217 858 A1, and EP 1999811 B1.

Preferably, the method includes the step whereby during the rest time of the oxidizing agent conveying device, the oxidizing agent is diverted such that it does not flow through the fuel cell stack or the regenerator. In other words, the controller or regulator of the motor vehicle is able to divert the flow conveyed during the rest time as a result of the rest speed of the fluid conveying device into other devices. For example, a bypass can be provided. This would be particularly advantageous if pure oxygen or other oxidizing agents are used as the oxidizing agent rather than air.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram of torque M due to friction in a bearing as a function of rotational speed n.

DETAILED DESCRIPTION OF THE DRAWING

FIG. 1 shows schematically the torques $M_d$ caused by friction in the bearing as a function of the rotational speed n. The continuous curve shows the runup from standstill of the bearing. Initially, a breakaway torque $M_{d\ los}$ should be applied to set the shaft mounted in the aerodynamic bearing in motion. The air bearing usually has retaining devices, for example, a spring. These retaining devices bear against the shaft when standing. When the shaft is accelerated from standstill, solid-state friction or adhesive friction occurs in the rotational speed range from n=0 to $n_{fixed\ acceleration}$. The retaining devices are in continuous contact with the shaft. In the rotational speed range from $n=n_{fixed\ acceleration}$ to $n_{lift}$, mixed friction occurs. At or above the lifting speed $n_{lift}$, the bearing builds up an air film for mounting free from mixed friction. The fluid conveying device is operated in this rotational speed range above the lifting speed $n_{lift}$.

Usually a certain safety margin is provided for the lifting speed $n_{lift}$, in order to reliably avoid any bearing damage. For example, a conveying device can have a conveying range which is defined by a lower limiting operating speed $n_{operation\ u}$ and an upper limiting operating speed $n_{operation\ o}$, where the lower limiting operating speed is sufficiently far from the lifting speed $n_{lift}$.

Up to the lifting speed $n_{lift}$, the friction torque $M_d$ decreases continuously. In the air friction region (i.e. n greater than or equal to $n_{lift}$), the friction torque $M_d$ gradually increases again slightly.

If the conveying device is now braked again from the conveying region, during the braking process an approximately identical speed-dependent torque profile is established up to the lifting speed $n_{lift}$, as for the runup.

Below the lifting speed $n_{lift}$, however, a different speed-dependent torque profile is established, which is shown by the dashed line in FIG. 1. Initially, the region of air friction, i.e. the region in which an air film is present for mounting free from mixed friction, continues to exist as far as the lowering speed $n_{low}$. At the lowering speed $n_{low}$ as far as the speed $n_{fixed\ braking}$, mixed friction occurs before adhesive or solid-state friction occurs at even lower speeds.

The lowering speed $n_{low}$ is lower than the lifting speed $n_{lift}$. According to the technology disclosed here, the conveying device or the bearing of the conveying device should be operated precisely in this rest region between the lowering speed $n_{low}$ and the lifting speed $n_{lift}$ when the conveying device is in rest mode or standby mode. The rest region therefore has comparatively lower speeds than the conveying region of the conveying device. The friction torques are comparatively low in this rest region. Accordingly the energy consumption in the rest mode is also comparatively low.

It should be noted that the torque profiles in FIG. 1 are merely shown schematically and in a simplified manner. The values for the different speeds such as, for example the lowering speed $n_{low}$ and the lifting speed $n_{lift}$ are dependent on the design of the bearing and the applied load. They can be determined experimentally.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a fluid conveying device of a motor vehicle having at least one aerodynamic bearing, the method comprising the acts of:
    reducing a rotational speed of the aerodynamic bearing to a rest speed, wherein
        the rest speed lies below a lifting speed, at which the bearing forms an air film for mounting free from mixed friction, and
        the rest speed lies above a lowering speed at which the bearing has reduced the air film in such a manner that mixed friction occurs; and
    operating the bearing of the fluid conveying device at the rest speed.

2. The method according to claim 1, wherein
the fluid conveying device is not stopped and the bearing is operated at least at the rest speed when the motor vehicle is operating.

3. The method according to claim 2, wherein
the fluid conveying device is not stopped and the bearing is operated at least at the rest speed when the motor vehicle continues to move.

4. The method according to claim 3, wherein
the fluid conveying device is not stopped and the bearing is operated at least at the rest speed when the motor vehicle continues to move at a maximum speed of 70 km/h.

5. The method according to claim 4, wherein the maximum speed is 50 km/h.

6. The method according to claim 4, wherein the maximum speed is 30 km/h.

7. The method according to claim 4, wherein
the fluid conveying device is not stopped and the bearing is operated at least at the rest speed when drive energy is provided by a high-voltage storage device.

8. The method according to claim 3, wherein
the fluid conveying device is not stopped and the bearing is operated at least at the rest speed when drive energy is provided by a high-voltage storage device.

9. The method according to claim 1, wherein
the fluid conveying device is not stopped and the bearing is operated at least at the rest speed when the motor vehicle continues to move.

10. The method according to claim 1, further comprising the acts of:
    predicting a rest time; and
    stopping the fluid conveying device when the predicted rest time exceeds a limiting value of the rest time.

11. The method according to claim 10, wherein the act of predicting the rest time comprises the acts of:
    recording driving behavior information, navigation information, and/or environmental information; and
    predicting the rest time taking into account the driving behavior information, the navigation information, and/or the environmental information.

12. The method according to claim 1, wherein the fluid conveying device is an oxidizing agent conveying device, which conveys oxidizing agent to a fuel cell stack and/or to a regenerator.

13. The method according to claim 12, wherein during the rest time of the oxidizing agent conveying device, the oxidizing agent is diverted so as not to flow through the fuel cell stack or the regenerator.

* * * * *